United States Patent [19]

Goetz et al.

[11] Patent Number: 4,633,198

[45] Date of Patent: Dec. 30, 1986

[54] FLEXIBLE (MULTI-MODE) WAVEFORM GENERATOR

[75] Inventors: Paul W. Goetz, Phoenix, Ariz.; Kim R. Merley, Rio Rancho, N. Mex.

[73] Assignee: The United States of America as represented by the Secretary of the Air Force, Washington, D.C.

[21] Appl. No.: 838,855

[22] Filed: Mar. 12, 1986

[51] Int. Cl.[4] .......................... H03C 3/00; G01S 13/00
[52] U.S. Cl. ......................................... 332/22; 342/25; 342/195
[58] Field of Search ................. 332/9 R, 10, 16 R, 22; 343/5 R, 5 DP, 17.1 R; 375/61

[56] References Cited

U.S. PATENT DOCUMENTS

| | | | |
|---|---|---|---|
| 4,176,328 | 11/1979 | Brown et al. | 332/16 T |
| 4,177,706 | 12/1979 | Greenberger | 84/1.01 |
| 4,347,403 | 8/1982 | Schwager et al. | 179/1 SA |
| 4,438,503 | 3/1984 | White et al. | 364/721 |
| 4,454,486 | 6/1984 | Hassun et al. | 332/16 R |
| 4,519,027 | 5/1985 | Vogelsberg | 364/185 |
| 4,584,708 | 4/1986 | Eilers et al. | 332/22 X |

Primary Examiner—Eugene R. LaRoche
Assistant Examiner—D. C. Mis
Attorney, Agent, or Firm—William G. Auton; Donald J. Singer

[57] ABSTRACT

The generation waveforms is accomplished using: a computer, two random access memories (RAM), a digital-to-analog converter (DAC), two modulators, two oscillators, and a multiplier. The computer inputs a set of digital waveforms and a first control signal into the first RAM which, when directed, conducts them to the DAC. The DAC converts the digital waveform to an analog waveform, and conducts the analog waveform and the first control signal to the first modulator. The first modulator produces an output signal by single sideband (SSB) modulating an intermediate frequency carrier from the first oscillator with the analog waveform when directed to modulate by the first control signal, and outputs the analog waveform otherwise the multiplier increases the bandwidth of signals from the first modulator by multiplying its output signal. The output of the multiplier is received by the second modulator. The second modulator is a biphase modulator which produces an output signal by biphase modulating a radio frequency carrier signal from the second oscillator with the signal from the multiplier when directed to modulate by a second control signal received from the second RAM, and outputting the signal from the multiplier otherwise. The result is a waveform generator capable of producing three categories of waveforms: single sideband modulated waveforms, biphase modulated waveforms, and waveforms that are both SSB and biphase modulated.

4 Claims, 8 Drawing Figures

FLEXIBLE (MULTI-MODE) WAVEFORM GENERATOR

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to radar systems, and specifically to a waveform generator for a synthetic aperture radar (SAR) system which generates waveforms which may be: frequency modulated (FM), biphase modulated, or a combination of both modulations.

The tasks of generating waveforms which may be modulated with a combination of frequency modulation and biphase modulation is alleviated, to some extent, by the following U.S. patents, which are incorporated herein by reference:

U.S. Pat. No. 4,176,328 issued to Brown et al;
U.S. Pat. No. 4,177,706 issued to Greenberger;
U.S. Pat. No. 4,347,403 issued to Schwager et al;
U.S. Pat. No. 4,438,503 issued to White et al;
U.S. Pat. No. 4,454,486 issued to Hassun et al; and
U.S. Pat. No. 4,519,027 issued to Vogelsberg.

Waveform generators are disclosed for a variety of uses in the references cited above. White et al discloses a waveform synthesizer for calibrating VHF omnidirectional radio (VOR) equipment by synthesis of a series of waveforms representative of different positions in azimuth. The patented system involves combining information from first and second memory areas and passing the information through a digital-to-analog converter. In Hassun et al the synthesizer provides high frequency synthesized waveforms for a user. It combines digital information in parallel and may accomplish frequency and phase modulations of the synthesized waveforms.

Biphase modulation of carrier signals is disclosed in the Brown reference cited above. The Brown reference has been incorporated since it describes in detail a biphase modulator.

While the references of Brown and White et al are exemplary in the art, a need still remains to produce waveforms which are combinations of frequency modulated carriers and biphase modulation. The present invention is intended to satisfy that need.

SUMMARY OF THE INVENTION

The present invention is a waveform generator for a radar system which produces a variety of waveforms by combining biphase modulation to a modulated signal from a single sideband (SSB) or other modulator. Waveform generation is accomplished using a digital computer connected through a random access memory (RAM), a digital-to-analog converter (DAC), a single sideband modulator (SSB-MOD), a times four multiplier, and a biphase modulator. The computer is also connected through a second random access memory (RAM) directly to the biphase modulator.

The digital computer controls the waveform generator and is used to input the digital equivalent of selected waveforms into the first RAM. Upon a command from this computer, the first RAM outputs the digital equivalent signals to the DAC where desired analog waveforms are produced. These analog waveforms are used to modulate a carrier by the SSB modulator and produce a first modulated signal.

The biphase modulator receives the first modulated signal from the SSB, and biphase code instructions from the second RAM. When required, the biphase modulator performs biphase modulation on the first modulated signal to produce a second modulated signal. The result is a waveform generator capable of producing: single sideband modulated signals; biphase modulated signals; and a combination of biphase and single sideband modulated signals.

While the preferred embodiment makes use of a single sideband modulator as a first modulator, a conventional frequency modulator (FM) may be used as a substitute. Note that when only biphase modulation is required, the carrier from the first modulator is a gated continuous wave (CW) signal.

For waveforms without biphase modulation, the biphase modulator simply conducts the signals from the first modulator to an output without changing the status of signals from the first modulator. The waveform generator therefore is capable of producing a variety of waveforms that may be one of the following: single sideband modulated waveforms; biphase modulated waveforms; and waveforms that are both single sideband modulated and biphase modulated.

The signals output from the biphase modulator are sent to the transmitter of the radar system to allow it to transmit the variety of waveforms produced by the present invention.

It is an object of the present invention to generate a wide variety of waveforms of a radar system.

It is another object of the present invention to generate waveforms that are either: frequency modulated, biphase modulated, or a combination of both frequency and biphase modulated.

These objects together with other objects, features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

The present invention is a waveform generator which generates a variety of waveforms that may be: frequency modulated, biphase modulated, or a combination of both frequency and biphase modulated.

Figure 1:
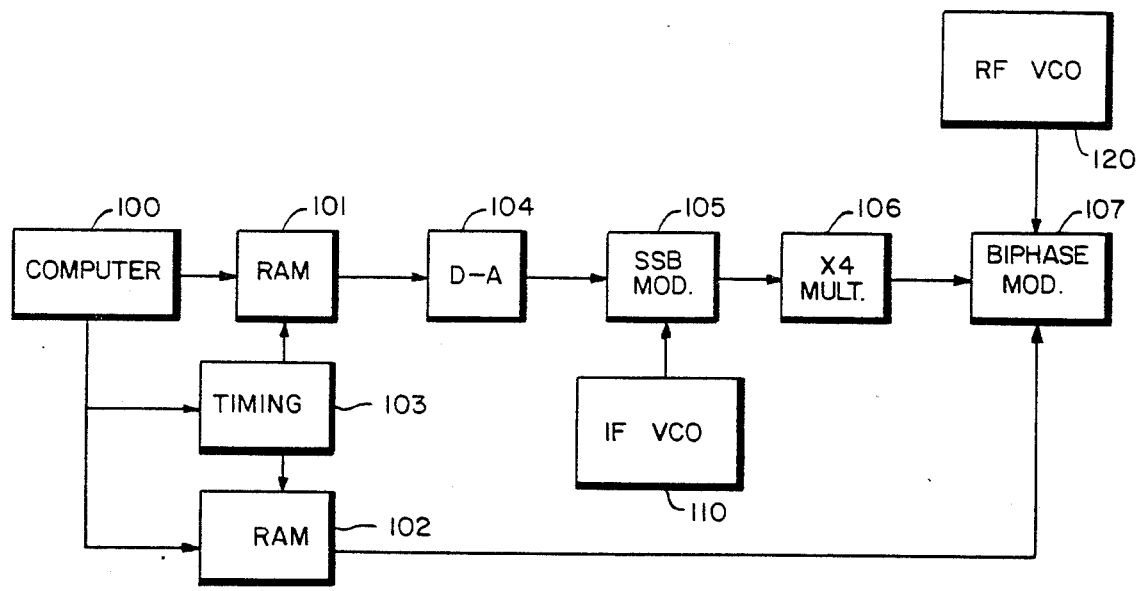
FIG. 1 is a block diagram of an embodiment of the present invention.

The reader's attention is now directed towards FIG. 1, which is a block diagram of an embodiment of the present invention. As shown in FIG. 1, waveform generation is accomplished using: a digital computer 100, two random access memories 101 and 102, and a timing clock 103, as a control means; a digital-to-analog converter (DAC) 104, and a single sideband modulator 105 as a first waveform generator; and a multiplier 106 and biphase modulator 107.

The digital computer 100 has two purposes. First it controls the waveform generation process described below. The second purpose of the computer is to generate files for the digital values of waveforms in the two RAM's 101 and 102. These digital values can be stored on conventional means, such as disks or tapes, and input via the computer 100 into the RAM's 101 and 102.

From the first RAM 101, the digital equivalent of the desired waveform is input into the DAC 104 to be converted back into an analog signal which will be used by the first modulator 105 to modulate a reference carrier. Such digital waveform generation techniques are discussed below.

Figure 2:
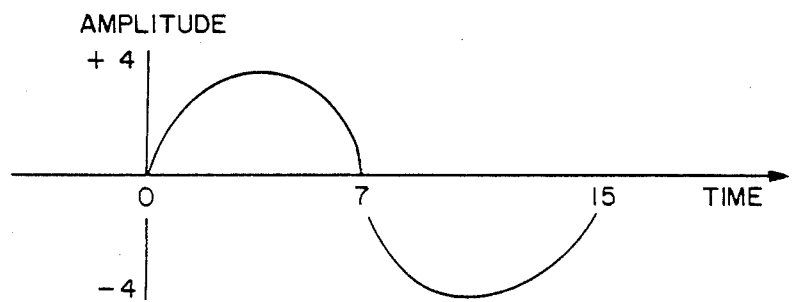
FIG. 2 is a chart of an example analog waveform.
Figure 3:
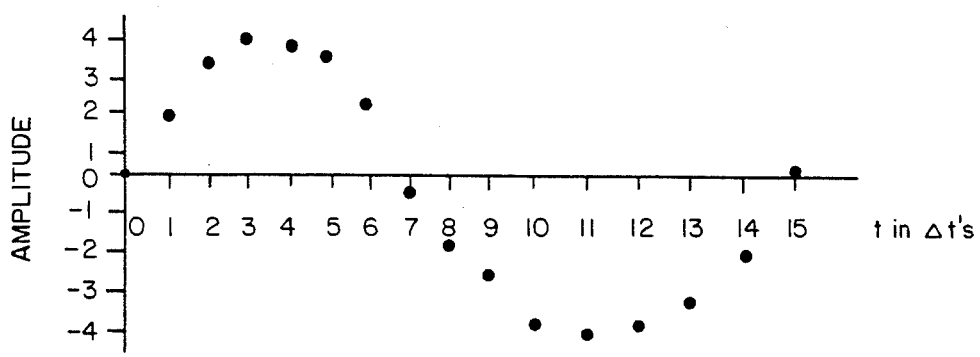
FIG. 3 is an impulse sampled waveform of the waveform of FIG. 2 without quantization.

FIG. 2 is a chart of an example of an original waveform. It is desired to store this waveform in a digital memory. Digital memories can only store discrete values. If the number of discrete (time and amplitude) values of this sample waveform were increased to infinity, it would become the analog waveform. So, the waveform must be sampled at uniform time intervals, $\Delta t$ as shown in FIG. 3, and these samples must be converted from analog to digital values. This is exactly what an analog-to-digital (ADC) does. The waveform to be stored is fed to the ADC's input. The ADC samples this waveform every $\Delta t$ seconds and, between one sample and the next, it converts the samples analog value to an N-bit digital number which is then available to be stored in a memory. In this way, an analog waveform can be stored in a digital memory such as the RAM 101 of FIG. 1.

FIG. 3 is a chart of an impulse sampled waveform taken from the example waveform of FIG. 2. There are three constraints on the above process:

(1) the sampling frequency ($F_s = 1/\Delta t$) must be at least twice the highest significant frequency component of the waveform to be stored;

(2) the memory must be large enough to store the waveform; and (3) digital quantization must be fine enough to reproduce the waveform to sufficient accuracy.

Consider for example the recording of a 30 second radio commercial message in a digital memory. The highest audio frequency is limited to 3 kHz by a low-pass filter placed between the radio and the ADC. The ADC's minimum sampling rate (Nyquist rate) is then 6 kHz. The memory size required for a 30 second message is then 6000 Hz $\times$ 30 seconds = 180,000 samples or words of memory.

To play back a digitally stored waveform, all that is necessary is to reverse the above process. The stored memory is read out into a DAC, at the same sampling frequency at which the ADC sampled waveform. This DAC converts the stored digital information into the original analog waveform.

Figure 4:
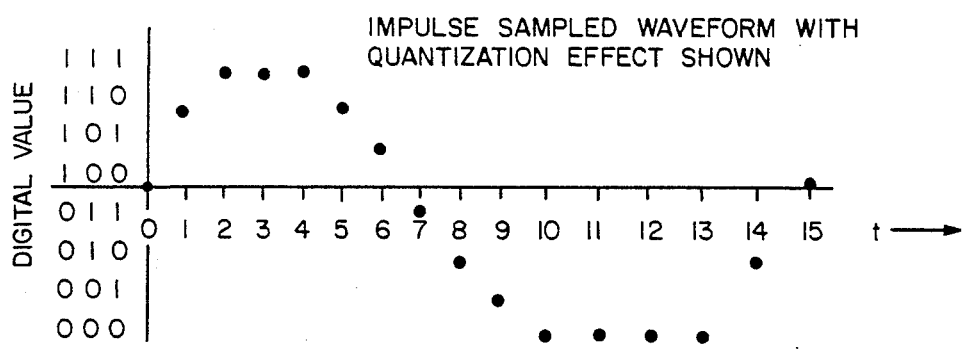
FIG. 4 is the waveform of FIG. 2 after 3-bit analog-to-digital converter eight level quantization.
Figure 5:
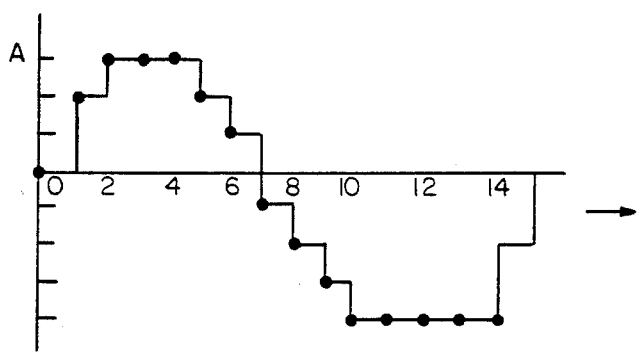
FIG. 5 is a raw digital-to-analog output for the example waveform.

The output of the DAC is not precisely the same as the original waveform. Something is lost in each analog-to-digital and digital-to-analog translation. During the analog-to-digital translation, what is actually stored is the impulse-sampled and quantized version of the original waveform (see FIG. 4 and Table 1). This translation causes errors to be introduced:

(1) If there are any frequencies in the sampled waveform above one-half the Nyquist rate;

(2) Due to amplitude quantization;

(3) From sampling-time jitter;

(4) Because of the hold function of the sample and hold;

This means the output of the DAC is quantized sampled-and-held version of the original waveform (see FIG. 5). This is not at all the same as the original waveform, although a relationship between the two does exist.

TABLE 1

Numbers Actually Stored in Memory from Quantization Process.

| MEMORY LOCATION | STORED VALUE FROM 3-BIT ADC |
|---|---|
| 0 | 100 |
| 1 | 101 |
| 2 | 111 |
| 3 | 111 |
| 4 | 111 |
| 5 | 110 |
| 6 | 101 |
| 7 | 011 |
| 8 | 010 |
| 9 | 001 |
| 10 | 000 |
| 11 | 000 |
| 12 | 000 |
| 13 | 000 |
| 14 | 010 |
| 15 | 100 |

The determination of how will the original waveform be recovered depends on the required fidelity. If the required fidelity is not high, the raw DAC output may be close enough. On the other hand, if the fidelity is necessary, the DAC output must be filtered and amplitude and phase equalizer may be required.

Figure 6:
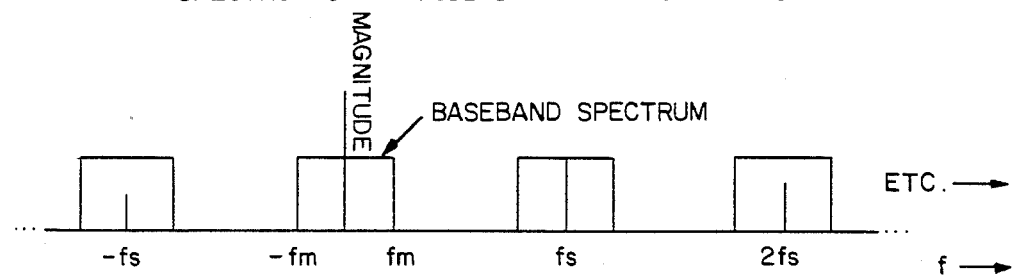
FIG. 6 is a chart of the impulse sampled baseband spectrum.
Figure 7:
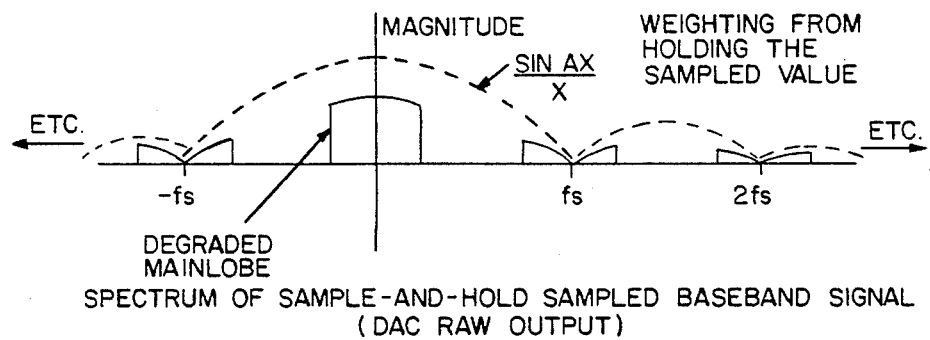
FIG. 7 is a chart of the spectrum of sample-and-hold sampled baseband signals.
Figure 8:
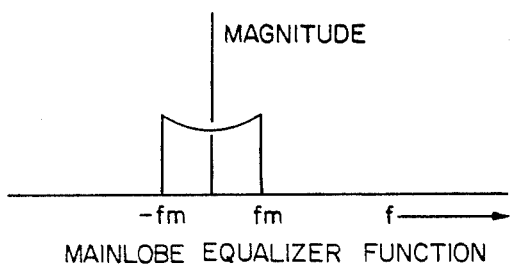
FIG. 8 is a chart of the mainlobe equalizer function.

The filter attenuates the alias spectra, which are centered around the sampling frequency and its harmonic (FIGS. 6 and 7). The amplitude equalizer may be necessary because of the sample-and-hold nature of the DAC output. An impulse sampled function has alias spectra around the sampling frequency and its harmonics, as does the sample-and-hold waveform. The sample-and-hold signal also has a (sin ax)/x weighting on its spectrum (FIG. 7). This changes the shape of the mainlobe, smoothing out its corner frequency response. This (sin ax)/x weighting has nulls at multiples of the sampling frequency. This weighting has a beneficial "filtering" effect on the alias spectra, but it degrades the mainlobe slightly. The amplitude equalizer is used to correct this mainlobe degradation if necessary (FIG. 8).

If the phase of the output waveform must be preserved, this causes problems. It is possible to have either a sharp cutoff filter or a linear phase filter, but not both. If a linear phase filter is used, the phase is undistorted but, because of the filter's slow amplitude rolloff, some alias spectra information may still be in the signal. This causes some amplitude and phase distortion. To compensate for the filter's slow rolloff there must be more space between the desired spectrum and the alias spectra. In this case, a fixed sampling frequency means that the generated signal's bandwidth must be reduced such that the closest alias spectrum's closest sideband can be effectively filtered out while the desired spectrum is left intact.

It may be feasible to use a sharp cutoff filter and predistort (during the waveform's point calculations)

the generated signal such that the filter's distortion is cancelled by the signal's distortion.

Returning to FIG. 1, the DAC 104 outputs a waveform to the first modulator 105. Although a single sideband modulator 105 is depicted as the first modulator, a conventional amplitude modulation (AM) or frequency modulation (FM) modulator could be used as the first modulator in the broad concept of this invention. Since these conventional modulators are known in the art, their use is only briefly described below.

The SSB modulator 105 of FIG. 1 receives a low frequency analog waveform from DAC 104. This low frequency signal is modulated with an intermediate frequency carrier to produce an SSB modulated carrier signal.

FIG. 1 is a times 4 multiplier depicted. Note that this multiplier is not necessary to practice the invention. The modulation carrier signal produced by the SSB modulator 105 has a frequency near that of the low frequency signal (plus or minus the frequency of the intermediate frequency carrier depending on whether the upper or lower sideband is selected). The generated bandwidth of the modulated carrier signal is expanded by four, using the times four multiplier 106. While the result is a larger bandwidth, narrower bandwidths could have been used.

An expanded modulated carrier signal is received by the biphase modulator 107 from the times four multiplier 106. The biphase modulator 107 will emit three broad categories of modulated waveforms depending upon the instructions it receives from the second RAM 102, as well as the instructions conveyed by the first RAM 101 to the first modulator 105.

The first category of waveforms produced by the biphase modulator consists of waveforms that are both biphase modulated and SSB modulated. In producing these waveforms the SSB modulator operates as described above, and the biphase modulator 107 modulates a radio frequency (RF) carrier with the expanded modulated carrier signal received from the multiplier 106. Since biphase modulators are known in the art and described in the Brown reference cited above, a further description of biphase modulation is not deemed necessary.

The second category of waveforms output by the biphase modulator consists of waveforms that have been modulated by the first modulator only. In producing these waveforms, the SSB modulator operates as described above, and the biphase modulator is instructed to not perform modulation but to simply conduct the signal it receives from the multiplier 106 as its own output.

The third category of waveforms output by the biphase modulator consists of waveforms that are biphase modulated only. In producing these waveforms, the SSB modulator is instructed not to modulate the low frequency signal but to simply conduct it to the multiplier 106 as its output. Therefore the biphase modulator receives only a continuous wave (CW) analog waveform produced by the DAC 104, which it will modulate with a radio frequency carrier it receives from an RF oscillator 120.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A waveform generator comprising:
   a digital-to-analog converter which receives a first control signal and a digital waveform signal and outputs an analog waveform signal and said first control signal;
   a first oscillator which outputs on intermediate frequency carrier signal;
   a first modulator which receives said first control signal and said analog waveform signal from said digital-to-analog converter, said first modulator also receiving said intermediate frequency carrier signal from said first oscillator, said first modulator producing an output signal by modulating said intermediate frequency carrier signal with said analog waveform signal when said first control signal directs it to modulate, said first modulator producing an output signal which equals said analog waveform signal when said first control signal directs it not to modulate;
   a second oscillator which outputs a radio frequency carrier signal;
   a second modulator which receives said radio frequency carrier signal from said second oscillator and said output signal produced by said first modulator, said second modulator also receiving a second control signal, said second modulator producing an output signal by biphase modulating said radio frequency carrier signal with said output signal produced by said first modulator when directed to modulate by said second control signal, said second modulator producing an output signal equalling the output signal of the first modulator when said second control signal directs it not modulate; and
   a control means which produces said digital waveform signal and said first and second control signals, said control means sending said first control signal and said digital waveform signal to said digital-to-analog converter, said control means sending said second control signal to said second modulator.

2. A waveform generator, as defined in claim 1, wherein said control means comprises:
   a first random access memory which receives, stores and transmits said digital waveform signal and said first control signal to said digital-to-analog converter;
   a second random access memory which receives stores and transmits said second control signal to said second modulator; and
   a data processor which inputs said digital waveform signal and said first control signal to said first random access memory, said data processor also inputting said second control signal into said second random access memory, said data processor thereby controlling the waveform generator.

3. A waveform generator, as defined in claim 2, wherein said first modulator comprises a single sideband modulator which produces its output signal by performing a single sideband modulation on said intermediate frequency carrier signal when said first control signal directs it to modulate, said single sideband modulator outputting said analog waveform signal when said first control signal directs it not to modulate.

4. A waveform generator, as defined in claim 3, including a multiplier which produces a multiplied signal by receiving and multiplying the output signal from said single sideband oscillator, said multiplied signal having a greater bandwidth than the output signal of the single sideband oscillator, said multiplier sending its multiplied signal to said second modulator in place of the output signal from the single sideband oscillator, said multiplier thereby providing a larger bandwidth to signals produced by said waveform generator.

* * * * *